(12) United States Patent
Liu et al.

(10) Patent No.: US 9,865,036 B1
(45) Date of Patent: Jan. 9, 2018

(54) IMAGE SUPER RESOLUTION VIA SPARE REPRESENTATION OF MULTI-CLASS SEQUENTIAL AND JOINT DICTIONARIES

(71) Applicant: PIXELWORKS, INC., Portland, OR (US)

(72) Inventors: Guodong Liu, Shanghai (CN); Junhua Chen, Shanghai (CN); Neil Woodall, Newport Beach, CA (US); Yue Ma, Pleasanton, CA (US); Bob Zhang, Santa Clara, CA (US)

(73) Assignee: PIXELWORKS, INC., Portland, OR (US)

( * ) Notice: Subject to any disclaimer, the term of this patent is extended or adjusted under 35 U.S.C. 154(b) by 141 days.

(21) Appl. No.: 14/615,075

(22) Filed: Feb. 5, 2015

(51) Int. Cl.
  *G06K 9/32* (2006.01)
  *G06T 3/40* (2006.01)
  *G06K 9/62* (2006.01)

(52) U.S. Cl.
  CPC .......... *G06T 3/4053* (2013.01); *G06K 9/6218* (2013.01); *G06K 9/6256* (2013.01)

(58) Field of Classification Search
  USPC ....... 382/299, 254, 298, 159, 177, 260, 107, 382/100, 191, 232; 235/462.41; 348/218.1, 219.1
  See application file for complete search history.

(56) References Cited

U.S. PATENT DOCUMENTS 8,306,316 B2 * 11/2012 Kameyama .......... G06K 9/4642
  382/107
8,538,139 B2 * 9/2013 Kameyama .......... G06T 3/4053
  382/159

OTHER PUBLICATIONS

Yeganli et al., "Image Super-Resolution via Sparse Representation over Coupled Dictionary Learning Based on Patch Sharpness", pp. 2-5-208, 2014.*

* cited by examiner

*Primary Examiner* — Anh Do
(74) *Attorney, Agent, or Firm* — Marger Johnson

(57) ABSTRACT

A method of developing an image training library includes receiving, at a processor, a set of high resolution image samples at a first resolution, generating a set of low resolution image samples having a second resolution from the set of high resolution images, wherein the second resolution is lower than the first resolution, clustering the low resolution image samples using features in the low resolution images, generating a low resolution dictionary for each cluster, generating sparse coefficients for each sample, and using the sparse coefficients to generate a high resolution dictionary for each cluster.

10 Claims, 7 Drawing Sheets

IMAGE SUPER RESOLUTION VIA SPARE REPRESENTATION OF MULTI-CLASS SEQUENTIAL AND JOINT DICTIONARIES

BACKGROUND

Various methods exist to scale a low resolution image to a high resolution image, including a method called sparse representation based image super resolution. Sparse representation super resolution typically involves two stages: a first offline training stage and a second reconstruction stage. The training process generally derives a dictionary for low resolution features, referred to as the low resolution dictionary, and a dictionary for high resolution features, referred to as the high resolution dictionary. Features generally consist of the high frequency components of the low resolution and high resolution images used for training. After training, the dictionaries can be used to create high resolution versions of new low resolution images. The features are optimized to minimize the number of dictionary entries (features) that need to be used to match the patches in the training library.

Many current methods of sparse representation super resolution produce only one low resolution dictionary and one high resolution dictionary. Because a great variety of structures such as edge, corner, chessboard patterns, random or regular textures exist in natural images; using one low resolution and one high resolution dictionary for every sample reduces the amount of information available to accurately reconstruct the image or increases the size of the dictionaries. It is advantageous to create multiple dictionaries, each optimized for a particular type of structure or texture.

In addition, several different kinds of training strategies exist for developing the low and high frequency dictionaries. For example, one method trains a low resolution dictionary and determines the sparse coefficients for all the feature vectors of low resolution patches and then uses those coefficients to develop a high resolution feature dictionary that best fits the high resolution training data. During image reconstruction, the samples of the high resolution features and the sparse coefficients corresponding to their low resolution features are used to create the high resolution version of the image. These learned dictionaries are referred to as sequential dictionaries. Another method creates the high resolution and low resolution features for the high and low resolution dictionaries simultaneously. In this method, the sparse coefficients and the features are developed simultaneously to optimize the performance with the training images. These dictionaries are referred to as joint dictionaries.

The sequential dictionaries method produces the sparse coefficients only by using the low resolution features, and the high resolution feature dictionary results from these coefficients, which is not optimal for the high resolution samples. This method does not produce the most detailed results, but the results are more stable and have fewer artifacts. In the joint dictionary approach, the optimum sparse coefficients used during training to generate the feature vectors using the low and high resolution samples will be different than those used during the reconstruction stage. This is because only the low resolution samples are known at the reconstruction stage. This may result in artifacts during reconstruction because only the low resolution samples are available to determine the sparse coefficients. However, this approach generally has more details than the sequential dictionaries approach.

DETAILED DESCRIPTION OF THE EMBODIMENTS

Figure 1:
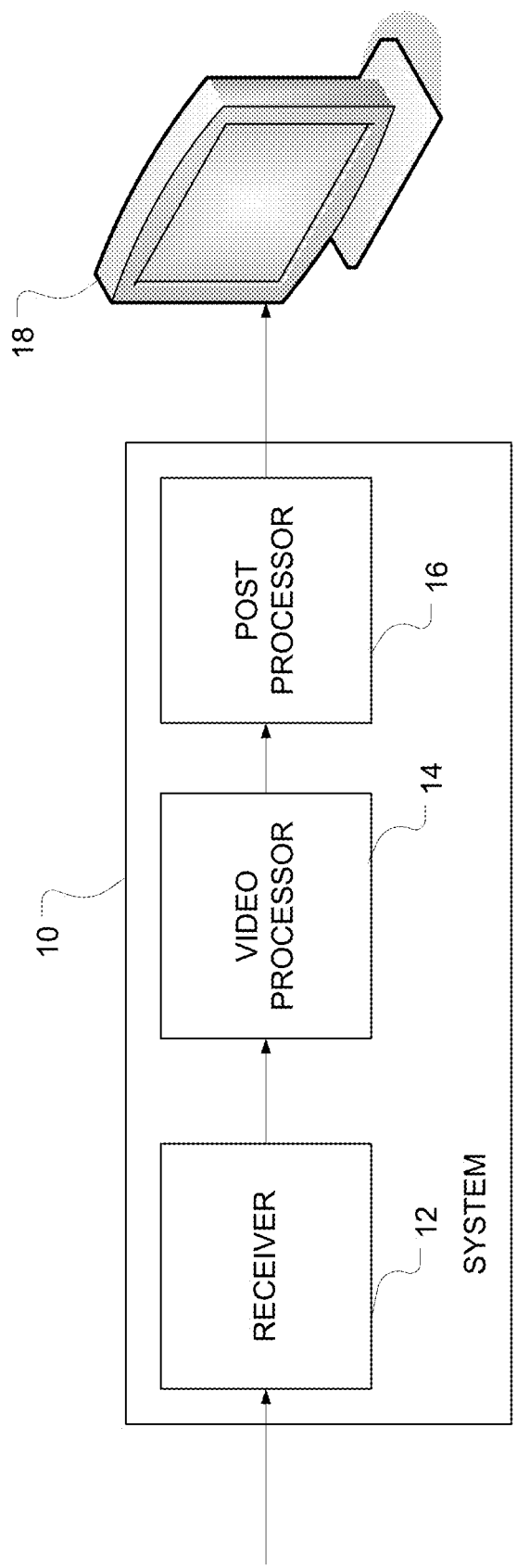
FIG. 1 shows a system diagram of one embodiment of a display system.

The embodiments here involve sparse representation based image super resolution for upscaling from low resolution to high resolution images. This discussion will use several terms having particular definitions. "Low resolution dictionary" means a dictionary of features for low resolution image data. Similarly, "high resolution dictionary" means a dictionary of features for high resolution image data. The term "features" or "feature vector" generally means the high frequency components of both the low resolution and the high resolution images. The low resolution feature vector usually contains multiple derivatives of the low resolution image, while the high-resolution feature vector usually contains just the high frequency information. The feature vectors in a dictionary differ from those of a sample patch in that they are optimized so that a minimal set of feature vectors can be combined to match the feature vector of a sample. In one embodiment, the high frequency information results from subtracting a mean of a patch from each element of the patch. A "patch" consists of a group of pixels in image data. In one embodiment, a patch is a 5×5 block of pixels. A "sample" is a specific instance of a patch in an image.

This process creates a dictionary of matched high and low resolution features in which a minimal linear combination of the features will accurately reconstruct the high resolution image patches from the low resolution image patches for the training set. That is, only a sparse subset of the dictionary is used. For a given combination of low resolution feature vectors in the dictionary that reproduce the low resolution input sample feature vector, the same linear combination of the matched high resolution feature vector in the dictionary will reconstruct the corresponding high resolution sample.

At the reconstruction stage, in order to get an unknown high resolution patch, the process calculates the required sparse coefficients by using the patch's corresponding low resolution features and the low resolution dictionary features that matches those of the low resolution patch. The unknown high resolution sample feature vector is then sparsely represented by elements of the high resolution dictionary using the same coefficients that reconstructed the low resolution features from the low resolution dictionary.

Many previous methods of sparsity based, or sparse representation, super-resolution only produce one low resolution dictionary and one corresponding high resolution dictionary for all samples. However, images have a great variety of structures, such as edge, corner, chessboard; and random or regular textures, etc. . . . . . The embodiments here proposed to cluster input samples and train dictionaries for each cluster. This will result in smaller dictionaries allowing for faster and more accurate reproduction of the high resolution image.

Solving sparse coefficients in sequential dictionaries is the same for both training and reconstruction stages. Because sparse coefficients are determined only by low resolution features and the high resolution dictionary is produced using these coefficients, the high resolution dictionary is usually not optimal for the high resolution samples. That is, the method does not produce the most detailed results. However, the results of the reconstruction are more likely to be stable and therefore have fewer artifacts.

In the joint dictionary methods, because only low resolution patches are known at reconstruction stage, the feature vectors generated from both high resolution and low resolution patches for solving sparse coefficients at the training and reconstruction stages are different. That is, the minimal set of sparse coefficients that provide the best match for both the low and high resolution features at the same time (training stage) will in general be different than those found if only the only requirement is to provide the best match to the low resolution features (reconstruction stage) Therefore more artifacts are generated during reconstruction process because only the low resolution patches are available to determine the sparse coefficients. However, it typically has more details.

In the embodiments here, at the training stage, feature vectors are generated for both the low and high resolution patches. The low resolution features are used to generate clusters. Then for each cluster, sequential and joint dictionaries are learned. At the reconstruction stage, for each low resolution feature vector, first determine which cluster it belongs to, then its high resolution feature vector is initially reconstructed using sequential dictionaries. After all high resolution features are reconstructed, refinements to the image data correct the errors and produce more details that are also more natural. One example of a refinement process is back projection constrained by joint dictionaries.

Figure 2:
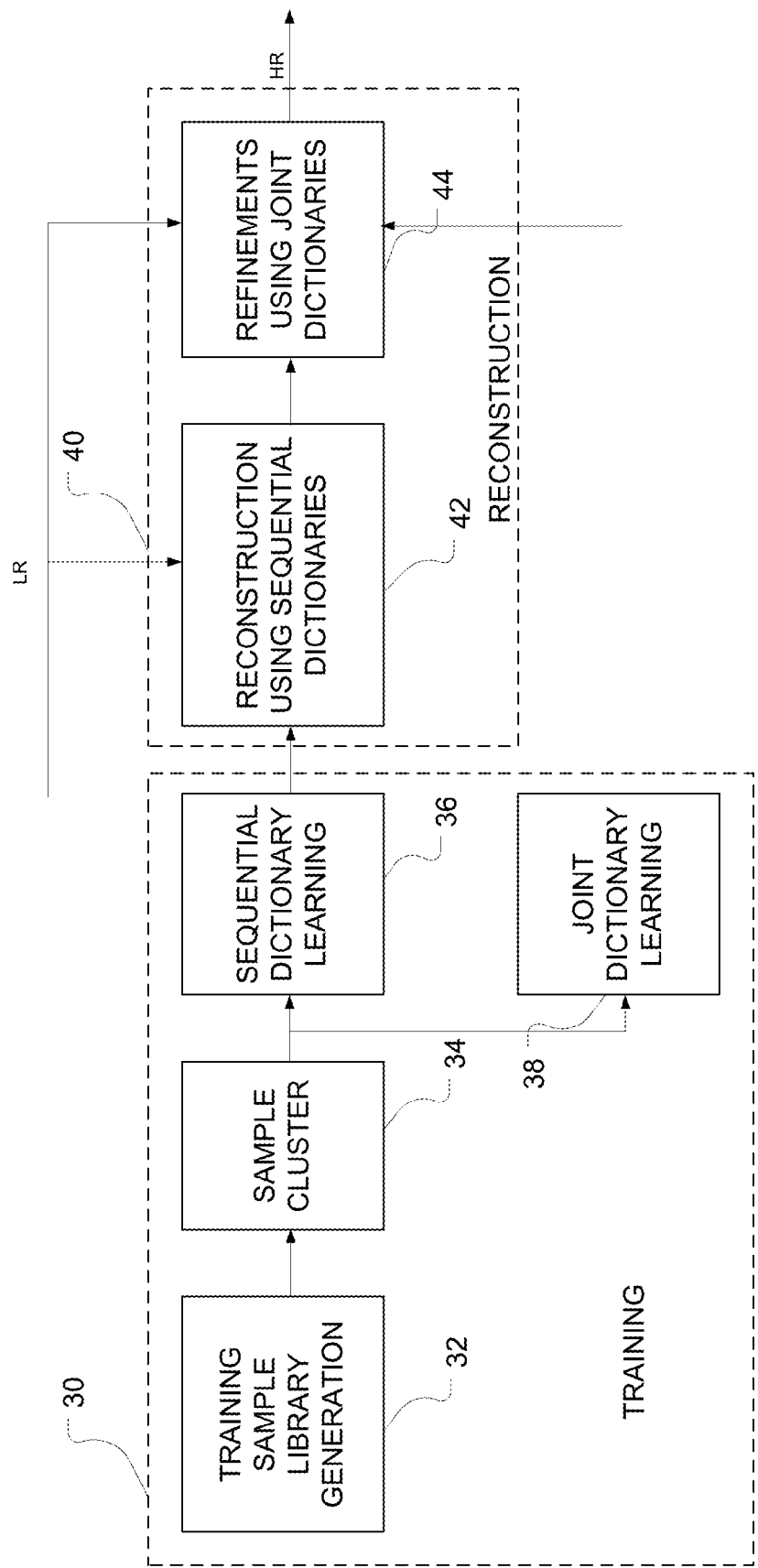
FIG. 2 shows a flow chart of an embodiment of a sparse representation super resolution method.

Image super-resolution via sparse representation of multi-class sequential and joint dictionaries is comprised of training and reconstruction stages. FIG. 1 shows an example of a display system in which a super resolution process may be employed. FIG. 2 shows an overview of the process.

In FIG. 1, a display system 10 receives image data from one of many possible sources, including broadcast television, DVD, downloaded content, computer generated images, etc. The display system could be any type of device that includes a display 18, including a television, a computer monitor, a smart phone, a gaming console, etc. A receiver 12, which may be a television receiver, or merely an input buffer to receive the input image data, passes the image data to a video processor 14 that performs image processing on the data. A post processor 16 may perform further operations on the data including sharpening, upscaling, etc. The super resolution process may occur in either the video process or the post processor. One must note that the term 'processor' may include general purpose processors, dedicated video processors, or a group of circuitry such as field programmable gate arrays, logic gates, etc. The processes disclosed herein may take the form of executable code or instructions that are executed by the processor, including the logic circuitry.

FIG. 2 shows an overview of an embodiment of a process to perform super resolution upscaling. The process has a training stage 30 and a reconstruction 40. During the training stage 30, a training sample library 32 is generated by collecting feature vectors of high and low resolution patches in all training images. The low resolution feature vectors are used for clustering at 34. The sequential high and low resolution dictionaries are learned at 36 and a joint dictionary is learned at 36. It should be noted that the training stage typically occurs only once during development of the video or post processor and is not part of the actual display system shown in FIG. 1. The display system includes the learned dictionaries and the reconstruction stage process.

During the reconstruction stage 40, an initial high resolution reconstruction is generated using the sequential dictionaries at 42. The initial high resolution reconstruction is then refined at 44. In one embodiment, the refinement may involve back projection of the initial reconstruction. The end result of the reconstruction stage is the final high resolution image.

Figure 3:
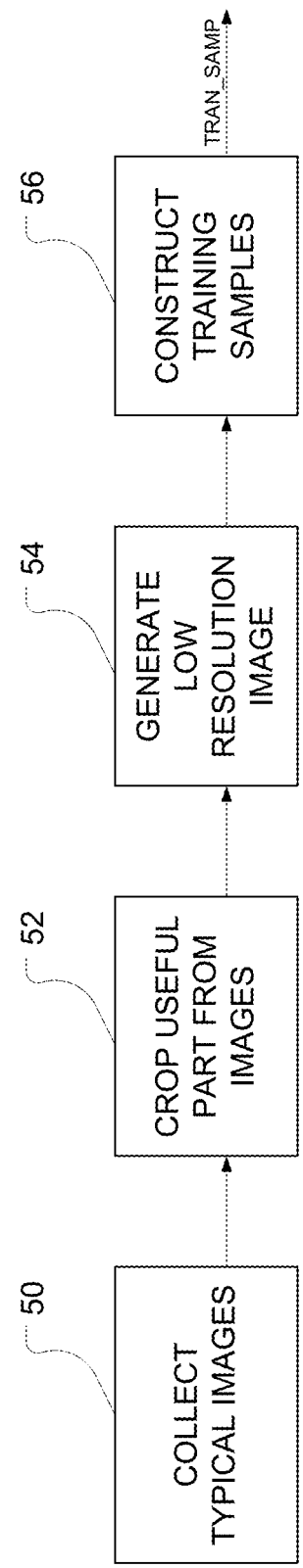
FIG. 3 shows a flow chart of an embodiment of a method of generating a sample library.

The training sample library plays a key role in sparse representation based super-resolution, because it greatly influences the quality of dictionaries. The training sample library decides the performance of high resolution image reconstructed by super-resolution. FIG. 3 shows an embodiment of a method of constructing a training sample library.

The training process uses a set of typical images that are collected at 50. The typical images are high-resolution, high-quality, and noise-free. The images include natural scenes, such as landscape, people, animals, plants, etc. . . . . . Because a good super-resolution should be able to deal with any type of contents, the images should also include artificial materials such as graphics, web page, desktop image, text, etc.

Because the original images often have some regions with little or no useful information such as smooth regions, it reduces the overhead in the library to crop the images at 52 to only include the useful parts which have textures or edges as part of the training sample library. The cropped images constitute the training image library. The cropped images are regarded as high resolution images.

The process generates a low resolution image for each high resolution image in the collection of images at 54. In one embodiment, the low resolution image is generated by down-sampling the high resolution image using a low-pass, poly-phase filter, for example a Gaussian low pass filter, with scaling ratio equal to 1/2. The resulting low resolution image is then up-sampled the result of using a poly-phase filter or bicubic filter by scaling ratio of 2. The result image is regarded as a low resolution image whose size is same as a high resolution image. While the method described uses 2×scaling as an example, it can be easily generalized to any scaling ratio.

For each 5×5 patch $HP_i$ in each high resolution image, the process calculates its mean $mx_i$, then subtracts the mean from this patch. The results then reshape the result ($HP_i - mx_i$) to get a one-dimensional high resolution feature vector $x_i$. While this is used in one embodiment, other features can be easily used to replace it in the described method. For example, instead of subtracting the mean of $HP_i$, one could subtract the mean of $LP_i$ which is the corresponding patch in the low resolution image. One constraint is that the high resolution features $x_i$ plus low frequency information from the $LP_i$ accurately represent $HP_i$ because only the $LP_i$ is known during the reconstruction phase. In short, $$HP_i \approx x_i + f(LP_i).$$

For the corresponding patch $LP_i$ in the low resolution image, the low resolution feature $y_i$ can be used the same method as high resolution patch. A more appropriate low resolution feature is derived by using high pass filters to extract high frequency content. For example, four high pass filters $[-1, 0, 1]$, $[-1, 0, 1]^T$, $[-1, 0, 2, 0, -1]$ and $[-1, 0, 2, 0, -1]^T$ are used to yield four feature vectors for the patch, they are then concatenated to represent the low resolution feature. The reason is that the high frequency components of the low resolution image are the most important for predicting the lost high frequency content in the target high resolution image.

If the high resolution patch is too smooth to lend useful information, current high resolution and low resolution patches are unsuitable for learning dictionaries, the process disregards ($y_i$, $x_i$). Otherwise, the process collects it into training sample library at 56. After collecting enough samples, the training sample library is completed. All samples of the high resolution patches are $X=\{x_1, x_2 \ldots x_N\}$, and those of the corresponding low resolution patches are $Y=\{y_1, y_2 \ldots y_N\}$.

Returning to FIG. 2, after the library is generated at 32, they are clustered into samples 34. Because the training sample library has many kinds of structure or textures, it is better to cluster them to reduce the complexity of the sparse coefficient generation. Furthermore, because there are only low resolution features at the super resolution reconstruction stage, only low resolution features are used to do clustering. The samples in the set Y may be optionally normalized for clustering in order to decrease the cluster number as follows:

$$\tilde{Y} = \{\tilde{y}_1, \tilde{y}_2, \ldots, \tilde{y}_N\} = \left\{\frac{y_1}{\|y_1\|_2}, \frac{y_2}{\|y_2\|_2}, \ldots, \frac{y_N}{\|y_N\|_2}\right\}.$$

A clustering approach, such as k-means, is used to do clustering. K-means clustering generally partitions observations into k clusters in which each observation belongs to the cluster with the nearest mean, which serves as a prototype of the cluster. A more advanced clustering algorithm can also be used. After clustering, cluster number k, cluster center, and cluster index of each sample are derived.

Figure 4:
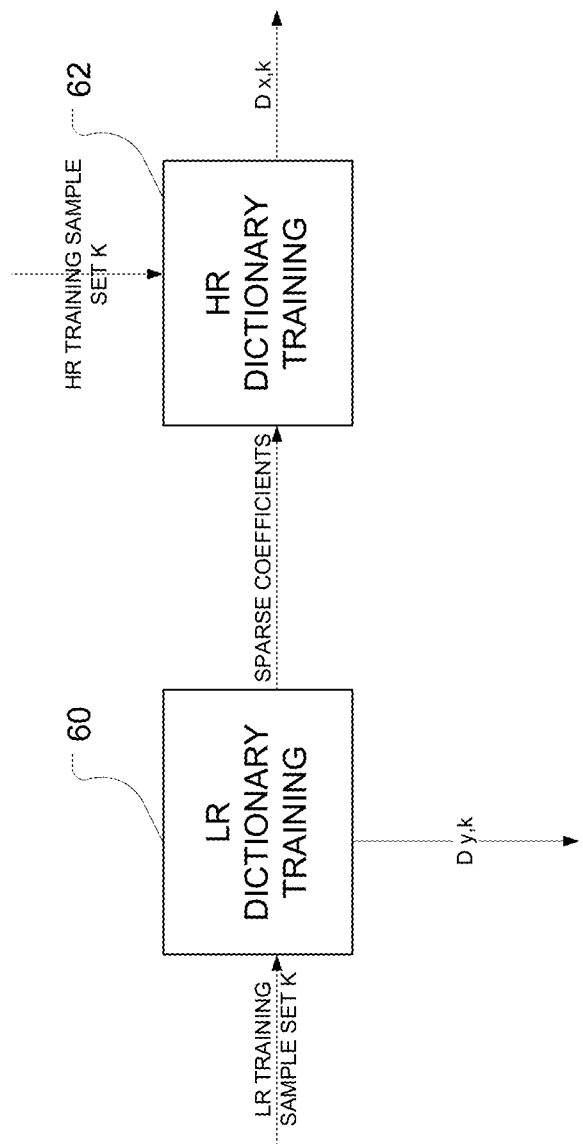
FIG. 4 shows a flow chart of an embodiment of a method of sequential dictionary training.

Sequential dictionaries are trained for each cluster as shown at 60 in FIG. 4. They are used to reconstruct an initial high resolution image. For cluster k, assume its high resolution training sample is set $X_k=\{x_{k1}, x_{k2} \ldots x_{kNk}\}$, and the low resolution training sample set is $Y_k=\{y_{k1}, y_{k2} \ldots y_{kNk}\}$. As shown in FIG. 4, the first low resolution dictionary $D_{y,k}$ is calculated by learning $Y_k$, and at the same time, the sparse coefficients for each low resolution sample is derived. First, all the low resolution samples may be normalized in the same manner as was used for clustering. Following normalization, an objective function may be built as follows $$\min_{D_{y,k},\{s_i\}_{i=1}^{NK}} \sum_{i=1}^{Nk} \|\tilde{y}_{ki} - D_{y,k}s_i\|_2^2 + \lambda\|s_i\|_1$$

Here, $D_{y,k}=\{d_{y,k1}, d_{y,k2}, \ldots, d_{y,Lk}\}$ is the low resolution dictionary, $\|d_{y,kj}\|_2 \leq j=1, \ldots, L_k$ is required, $s_i$ is the sparse coefficient vector, and $\lambda$ is parameter.

Then, using the sparse coefficients just generated, the high resolution dictionary $D_{x,k}$ is calculated by learning $X_k$ at 62. First, all high resolution samples are normalized as follows.

$$\tilde{X}_k = \{\tilde{x}_{k1}, \tilde{x}_{k2}, \ldots, \tilde{x}_{kN_k}\} = \left\{\frac{x_{k1}}{\|y_{k1}\|_2}, \frac{x_{k2}}{\|y_{k2}\|_2}, \ldots, \frac{x_{kN_k}}{\|y_{kN_k}\|_2}\right\}.$$

Then an objective function may be built as follows.

$$\min_{D_{x,k}} \sum_{i=1}^{Nk} \|\tilde{x}_{ki} - D_{x,k}s_i\|_2^2.$$

Because the sparse coefficients in this stage are the same as found during the low resolution dictionary training, the goal of this stage is to find the high resolution dictionary features that given the sparse coefficients accurately reproduce the features of the sample patch. This function is an ordinary least square problem, which can be easily solved.

Figure 5:
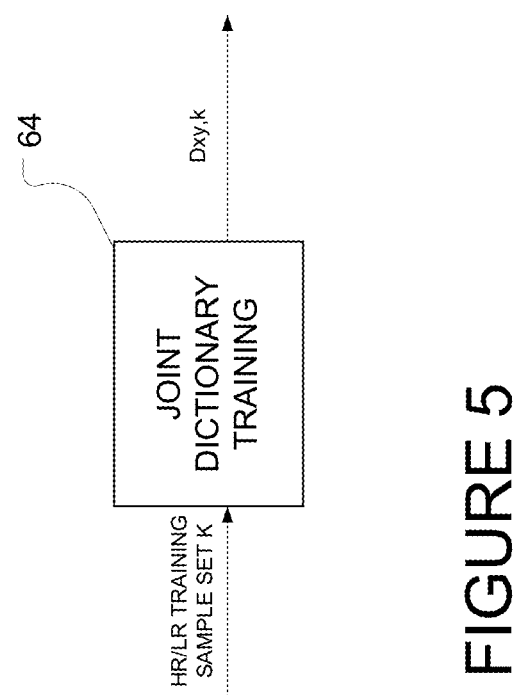
FIG. 5 shows an embodiment of a method of joint dictionary training.

Joint dictionaries are also trained for each cluster at 64 in FIG. 5. For cluster k, its high resolution and low resolution training samples are known. The process concatenates each high resolution sample $x_{ki}$ and low resolution sample $y_{ki}$ into a vector $xy_{ki}$. Because the high resolution sample and the low resolution sample may have different types and numbers of feature, better results can be obtained by using different weights. For example, a combined vector $xy_{ki}$ is $(w^*x_{ki}, v^*y_{ki})$, and w, v are weights less than 1. The new combined training sample set is $XY_k=\{xy_{k1}, xy_{k2} \ldots xy_{kNk}\}$.

All combined sample may be optionally normalized as follows.

$$\tilde{XY}_k = \{\tilde{xy}_{k1}, \tilde{xy}_{k2}, \ldots, \tilde{xy}_{kN_k}\} = \left\{\frac{xy_{k1}}{\|xy_{k1}\|_2}, \frac{xy_{k2}}{\|xy_{k2}\|_2}, \ldots, \frac{xy_{kN_k}}{\|xy_{kN_k}\|_2}\right\}.$$

Then an objective function may be built as follows.

$$\min_{D_{xy,k},\{s_i\}_{i=1}^{Nk}} \sum_{i=1}^{Nk} \|\tilde{xy}_{ki} - D_{xy,k}s_i\|_2^2 + \gamma\|s_i\|_1.$$

Here, $D_{xy,k}=\{d_{xy,k1}, d_{xy,k2}, \ldots, d_{xy,Lk}\}$ is the joint dictionary, $\|d_{xy,kj}\|_2 \leq j=1, \ldots, L_k$, is required, $s_i$ is a sparse coefficient vector, and $\gamma$ is a parameter. This dictionary can be decomposed into two parts, one for low resolution samples, and the other for high resolution samples. Actually, the high resolution dictionary is the upper part of the joint dictionary and low resolution dictionary is the lower part. It is decomposed as $$D_{xy,k} = \begin{pmatrix} D_{x,k}^{jnt} \\ D_{y,k}^{jnt} \end{pmatrix}.$$

Here, $D_{x,k}^{jnt}$ is the high resolution dictionary, and $D_{y,k}^{jnt}$ is the low resolution dictionary. They may be used as a constraint for refinement of the initial high resolution image, such as for back projection.

Figure 6:
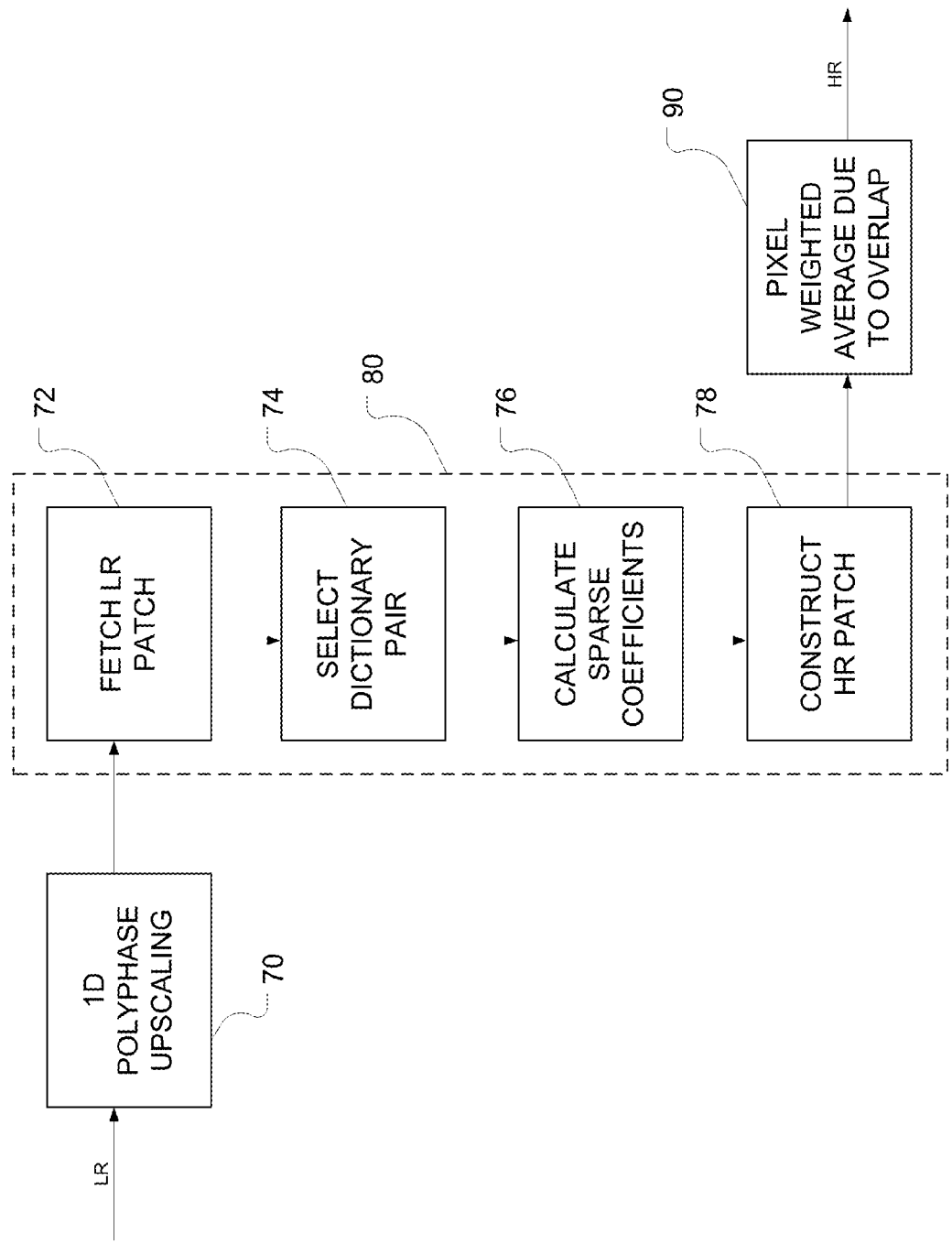
FIG. 6 shows a flow chart of an embodiment of a reconstruction method.

With the dictionaries now established, the process moves to the reconstruction phase 40 from FIG. 2. FIG. 6 shows an embodiment of reconstruction process 80. For an input image, its high resolution image is reconstructed at 80 by use of sequential dictionaries. In one embodiment, the reconstruction 80 is carried out in unit of 3×3 high-resolution patches with 1 pixel overlap in each direction (left, right, top and bottom). For example, for a 3×3 high resolution patch, an extended 5×5 patch surrounding it is reconstructed and filled into the high resolution image.

For an input low resolution image, the process upscales it at 70. In one embodiment the upscaling is accomplished using of 1D poly-phase filter. In order to get each high resolution patch, the process fetches its corresponding low resolution patch at 72, and selects the appropriate low resolution and high resolution dictionaries 74. These are then used to calculate the sparse coefficients at 76 and to construct the high resolution patch at 78. After all of the high resolution patches are obtained, pixel weighting average may be used because of pixel overlapping.

Having reviewed an overview of the process, the discussion now turns to a more detailed discussion of dictionary selection at 74. Because there are multiple dictionary pairs due to clustering, it is necessary to select the appropriate dictionaries. The process may first normalize $y_i$ by dividing by $\|y_i\|_2$. Second, it then calculates the distances between this normalized low resolution feature, or a non-normalized low resolution feature depending on how the cluster was generated, and each cluster center. Third, it selects the dictionaries ($D_{x,k}$, $D_{y,k}$) corresponding to closest cluster. Fourth, it finds the sparse coefficients. The computational model is $$\min_{s_i} \|y_i - D_{y,k} s_i\|_2^2 + \lambda \|s_i\|_1;$$

where $s_i$ is the sparse coefficient vector. However, unlike in the training case, only the sparse coefficients are allowed to vary. Finally, based on the high resolution dictionary and the sparse coefficients, high resolution patch $x_i$ is constructed as $$x_i = D_{x,k} * s_i + my_i.$$

The low resolution patch mean $my_i$ is used to approximate the mean of high resolution patch.

Because the mean of unknown $x_i$ is approximately equal to low resolution patch mean $my_i$, it is reasonable to use $my_i$ to replace the unknown high resolution patch mean in this reconstruction. Note that a more precise method constructs the high resolution sample library for sequential dictionary training using a high resolution sample patch minus the mean of the corresponding low resolution patch.

Once the reconstruction process constructs the high resolution patch at 78, the process needs to address pixel overlap. Overlap results from the overlap among adjacent high resolution patches, a single high resolution pixel is generated several times by adjacent high resolution patches. It is appropriate to multiply the high resolution pixels by different weights according to their positions in the corresponding high resolution patches.
One example of weights for a 5×5 patch is:

$$\begin{pmatrix} 0.1 & 0.3 & 0.3 & 0.3 & 0.1 \\ 0.3 & 1 & 1 & 1 & 0.3 \\ 0.3 & 1 & 1 & 1 & 0.3 \\ 0.3 & 1 & 1 & 1 & 0.3 \\ 0.1 & 0.3 & 0.3 & 0.3 & 0.1 \end{pmatrix}.$$

For each HR pixel, the sum of weighted reconstruction pixels and sum of weights corresponding to it are recorded, and it is equal to the ratio between these two sums.

The resulting high resolution image may be considered an initial high resolution image, as it may be further refined. One refinement is to perform back projection. Back projection is often used to impose the constraint that the found high resolution image will produce the original low resolution image given that you know how the low resolution image was blurred and down sampled originally. Back projection improves super resolution performance further after an initial high resolution is obtained. Here, a back projection followed sequential dictionaries based reconstruction can rectify the errors of an initial high resolution image.

However, a simple back projection often brings some ringing and jaggy artifacts near or on the edges. As it is known, at the training stage of sequential dictionaries, sparse coefficients are determined only by low resolution patches and the high resolution dictionaries are produced using these coefficients, so the high resolution dictionaries are usually not optimal for high resolution samples. At the reconstruction stage, the recovered high resolution patches are probably not optimal. In order to recover better high resolution patches, the optimal joint dictionaries may be selected if both the corresponding low resolution and high resolution patches are known. If one uses the initial high resolution image as the source for HR patches, the process can use the joint dictionaries as a constraint in back projection. The objective function is built as $$\min_{X, \{s_i\}} \left( \|Y - DGX\|_2^2 + \alpha \sum_{i=1}^{N} \left( \|F_x R_i X - D_{x,ki}^{jnt} s_i\|_2^2 + \|F_y R_i Y_{up} - D_{y,ki}^{jnt} s_i\|_2^2 + \beta \|s_i\|_1 \right) \right)$$

In this formula, the variables are defined as follows: X is the estimated HR image. Y is the input low resolution (LR) image; $Y_{up}$ is the upscaled low resolution image; D is the down-sample operator; and G is low pass operator. D and G are often merged by using 1D poly-phase down-sample filter to replace the operators. $R_i$ is an orthogonal projection operator which means fetch a patch (5×5) at position i. $F_x$ is the feature extraction operator for high resolution image. $F_y$ is the feature extraction operator for the low resolution image. They are the same as that for training joint dictionaries respectively. Note weight w is integrated into $F_x$, and v is integrated into $F_y$. N is the total number of patches in the high resolution image. Ki is the cluster index for patch i. For each 3×3 HR patch, based on the feature vector of its extended 5×5 low resolution patch, the closest cluster is found. The joint dictionaries of this cluster are used for the current high resolution and low resolution patches.

Figure 7:
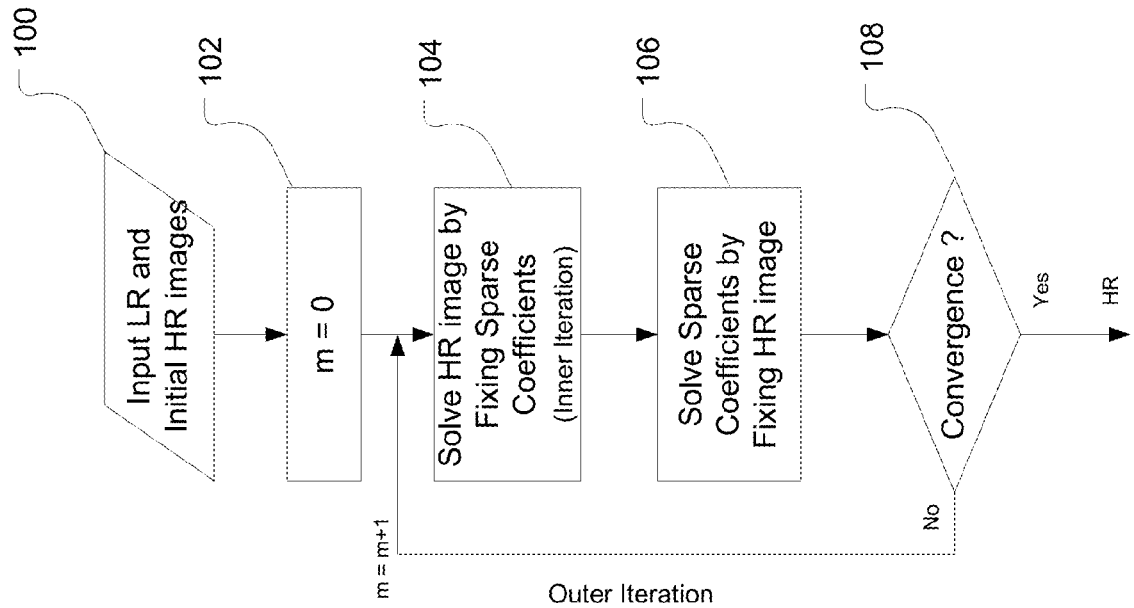
FIG. 7 shows an embodiment of a method of optimizing solving for a high resolution using sparse coefficients.

The strategy of optimization is to alternately solve high resolution image X and sparse coefficients $\{s_i\}$, i=1 . . . N, until convergence. One embodiment of an optimization process is shown in FIG. 7. The process receives the input low and high resolutions at 100. For iteration m, referred to here as the outer iteration, beginning at 102 until convergence at 108, the process first solves the new high resolution image X by fixing sparse coefficients $\{s_i\}$, i=1, . . . , N at 104 and then new sparse coefficients at 106 by fixing the HR image. The objective function is $$\min_{X} \left( \|Y - DGX\|_2^2 + \alpha \left( \sum_{i=1}^{N} \|F_x R_i X - D_{x,ki}^{jnt} s_i\|_2^2 \right) \right).$$

Here, $\{s_i\}$ is the set of sparse coefficients solved in iteration m−1. So, $D_{x,ki}^{jnt} s_i$, i=1 . . . N, are equivalent as the high resolution image solved in iteration m−1. If m is equal to 0, in the first iteration at 102, the $\{s_i\}$ are unknown, but there is no need for those to be solved. The initial high resolution image at 100 found using the sequential dictionaries can be used to approximate $D_{x,ki}^{jnt}s_i$. Note, it should be obvious to those skilled in the art that initial high resolution image used with the joint dictionary back projection method could be generated by methods such as 2D scaling or other super resolution methods.

The objective function can be approximated by $$\min_{X}(\|Y - DGX\|_2^2 + \alpha\|X - X_{sp}\|_2^2).$$

$X_{sp}$ is the high resolution image solved in iteration m−1 or the initial high resolution image at 100. This objective function can be optimized by steepest gradient descent method using iterations. The iterations used to find a new high resolution image are referred to here as inner iterations. The solved new high resolution image is named $X_{bp}$.

The process next solves the new sparse coefficients $\{s_i\}$, i=1 ... N by fixing high resolution image X at 106. Given the new high resolution image, $X_{bp}$, then find new sparse coefficients $\{s_i\}$, i=1 ... N using the joint dictionaries. Because the high resolution image $X_{bp}$, is known at the moment, the objective function can be simplified as $$\min_{\{s_i\}}\left(\sum_{i=1}^{N}(\|F_x R_i X_{bp} - D_{x,ki}^{jnt}s_i\|_2^2 + \|F_y R_i Y_{up} - D_{y,ki}^{jnt}s_i\|_2^2 + \beta\|s_i\|_1)\right).$$

Though there are overlapping pixels among adjacent patches, it is good enough to solve sparse coefficients for each high resolution/low resolution patch independently. The computational complexity is greatly decreased.

For each patch at position i, its sparse coefficients are calculated by solving $$\min_{s_i}(\|F_x R_i X_{bp} - D_{x,ki}^{jnt}s_i\|_2^2 + \|F_y R_i Y_{up} - D_{y,ki}^{jnt}s_i\|_2^2 + \beta\|s_i\|_1).$$

Here, assume $x_i$ is the feature vector of high resolution patch in $X_{bp}$, $y_i$ is the feature vector of low resolution patch in $Y_{up}$, $xy_i=(w^*x_i, v^*y_i)$ is the joint feature vector, and its normalization value is value is $\|xy_i\|_2$. The sparse coefficients are calculated are calculated by using the normalized joint feature vector.

After getting the new sparse coefficients, the new high resolution patch is calculated as follows. The feature vector of new HR patch is $$fx_i = D_{x,ki}^{jnt}s_i.$$

First the process fetches the old high resolution patch HPi in the known high resolution image $X_{bp}$, and then calculates its mean $mx_i$. The process then gets the new high resolution patch by adding the approximate mean as follows.

$$x_i = \frac{fx_i^*\|xy_i\|_2}{w} + mx_i$$

After all the new high resolution patches are calculated, due to pixel overlap, pixel weighting average is used to get the new high resolution image $X_{sp}$.

As discussed above the back projection method uses two types of iteration, outer iteration and inner iteration. Because the initial high resolution image generated by use of sequential dictionaries is better than other upscaling methods, such as 1D/2D poly-phase upscaling, very few iterations are required. From many experiments, no more than 3 outer iterations with only 1 inner iteration for each outer iteration can produce a high quality HR image.

In the embodiments discussed here, clustering is used and the dictionaries are trained for each cluster. Because the patch structures are similar in each cluster, the size of dictionaries in the cluster is much smaller than those without clustering. Moreover, the high resolution reconstruction errors are also reduced. Compared to other methods that do not have clustering but use sparse representation, these embodiments have fewer artifacts and use smaller dictionaries.

Using both sequential and joint dictionaries for HR image reconstruction has several advantages. The initial high resolution image reconstructed via sparse representation of sequential dictionaries has few artifacts. Refinement techniques, such as using back projection and constraining the process by using joint dictionaries improves the reconstruction quality of the high resolution image further. The final high resolution image has almost no artifacts and more details.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of developing an image training library, comprising:
   receiving, at a processor, a set of high resolution image samples at a first resolution;
   generating a set of low resolution image samples having a second resolution from the set of high resolution images, wherein the second resolution is lower than the first resolution;
   clustering the low resolution image samples using features in the low resolution images into clusters;
   generating low resolution and high resolution dictionaries using sparse coefficients for each cluster of samples; and
   storing the set of low resolution samples, cluster information associated with each sample, and the dictionaries.

2. The method of claim 1, wherein generating low resolution and high resolution dictionaries comprises:
   generating a low resolution dictionary for each cluster;
   generating sparse coefficients for each sample; and
   using the sparse coefficients to generate a high resolution dictionary for each cluster.

3. The method of claim 1, wherein generating low resolution and high resolution dictionaries comprises training a joint dictionary for each cluster.

4. The method of claim 1, wherein generating a set of low resolution image samples, comprising:
   collecting a set of high resolution images;
   cropping the images to isolate specific features of the images, where specific features include texture and edges;

generating a low resolution image from each of the high resolution image; and constructing training samples from the high resolution images.

5. The method of claim 4, wherein constructing training samples from the high resolution images comprises determining if the samples do not have sufficient texture to be included in the training library.

6. A method of generating super resolution images, comprising:

receiving, at a processor, an input low resolution image having a first resolution;

upscaling the low resolution image to produce an upscaled low resolution image, wherein the upscaled resolution is higher than the first resolution;

fetching a low resolution patch from the upscaled low resolution image, the low resolution patch corresponding to an input patch in the input low resolution image;

determining a cluster to which the input patch belongs based upon the low resolution patch;

using a sequential low resolution dictionary associated with the cluster to calculate sparse coefficients;

constructing a high resolution patch using a sequential high resolution dictionary associated with the cluster and the sparse coefficients;

repeating the fetching, determining, using and constructing until an initial high resolution image is produced; and refining the initial high resolution image.

7. The method of claim 6, wherein upscaling the input low resolution comprises using a one-dimensional poly-phase filter.

8. The method of claim 6, wherein refining the initial high resolution image comprises using a joint low resolution and high resolution dictionary for the sample to refine the initial high resolution image using a joint dictionary.

9. The method of claim 8, wherein using the joint low resolution and high resolution dictionary for the sample to refine the initial high resolution image comprises back projecting the initial high resolution image using the joint dictionary.

10. A method of refining an estimated high resolution image in a display device, comprising:

generating the estimated high resolution image having a second resolution from a low resolution image received at a processor in the device, the low resolution image having a first resolution lower than the second resolution, wherein the generating comprises identifying input patches in the low resolution image, determining clusters to which the input patches belong, calculating sparse coefficients for each cluster, and constructing the estimated high resolution image from high resolution patches derived from the low resolution patches; and back projecting the estimated high resolution image using a joint low resolution and high resolution dictionary as a constraint by alternately solving the high resolution image and sparse coefficients to create a final high resolution image; and display the final high resolution image on the display device.

* * * * *